United States Patent
Liu et al.

(10) Patent No.: US 10,516,939 B1
(45) Date of Patent: Dec. 24, 2019

(54) SYSTEMS AND METHODS FOR STEERING SPEAKER ARRAY AND MICROPHONE ARRAY WITH ENCODED LIGHT RAYS

(71) Applicant: FUJI XEROX CO., LTD., Tokyo (JP)

(72) Inventors: Qiong Liu, Cupertino, CA (US); Donald Kimber, Foster City, CA (US); Shang Ma, Irvine, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/026,062

(22) Filed: Jul. 3, 2018

(51) Int. Cl.
*H04R 1/40* (2006.01)
*H04S 7/00* (2006.01)
*H04R 3/12* (2006.01)
*G03B 21/20* (2006.01)
*H04R 3/00* (2006.01)

(52) U.S. Cl.
CPC ......... *H04R 1/406* (2013.01); *G03B 21/2046* (2013.01); *H04R 1/403* (2013.01); *H04R 3/005* (2013.01); *H04R 3/12* (2013.01); *H04S 7/302* (2013.01)

(58) Field of Classification Search
CPC ...... G03B 21/2046; H04R 1/32; H04R 1/323; H04R 1/326; H04R 1/40; H04R 1/403; H04R 1/406; H04R 3/005; H04R 3/12; H04S 7/302
USPC ...... 381/58, 92, 97, 355–357, 387; 345/633, 345/158; 359/630
See application file for complete search history.

(56) References Cited

U.S. PATENT DOCUMENTS

| | | | |
|---|---|---|---|
| 6,272,466 B1 * | 8/2001 | Harada | G06K 9/00221 704/270 |
| 9,197,974 B1 * | 11/2015 | Clark | H04M 9/08 |
| 2016/0021346 A1 * | 1/2016 | Liu | H04N 9/3105 348/744 |

* cited by examiner

Primary Examiner — Norman Yu
(74) Attorney, Agent, or Firm — Procopio, Cory, Hargreaves & Savitch LLP

(57) ABSTRACT

Described is a way to steer speaker array or microphone array based on direction outputs of tiny light sensors attached to TV viewers, noisy-environment workers, or AR/VR system users. More specifically, a light projector is disposed on a ceiling, which sends out different sequential on/off signals for each pixel. Two light sensors are attached to each speaker array or microphone array, and one or more light sensors are attached to each user. Because each projector pixel corresponds to a specific direction, when a light sensor receives sequential signal from the projector, the light sensor can determine its direction corresponding to the projector and report that to the central station. With the speaker/microphone array direction and user direction known, the system can generate proper phase shifts for different speaker signals and generate directional sound for each individual. Similarly, the central station can determine phase shifts for combining audios from different microphones.

21 Claims, 5 Drawing Sheets

SYSTEMS AND METHODS FOR STEERING SPEAKER ARRAY AND MICROPHONE ARRAY WITH ENCODED LIGHT RAYS

BACKGROUND OF THE INVENTION

Technical Field

The disclosed embodiments relate in general to acoustic systems and, more specifically, to systems and methods for steering speaker array and microphone array with encoded light rays.

Description of the Related Art

When a TV viewer wants to enjoy a show without interfering with other family members or different TV viewers prefer different volume levels, traditional headphones or earbuds are still not very convenient. In ubiquitous high quality augmented reality or virtual reality (AR/VR) environment, or high-noise environment with multiple participants, or high-end teleconferencing environment with multiple attendees and multiple video feeds, traditional sound capture approaches are insufficient to capture clean desired sound. Similarly, traditional sound generation approaches are also insufficient to generate clean directional sound, like humans experience in the real-world environment. In an AR/VR environment, if headsets' directions cannot match well with proper sound effect, consequently AR/VR participants may get confused or feel uncomfortable.

Therefore, in view of the above and other shortcomings of the conventional acoustic technology, new and improved systems and methods are needed that would steer a speaker array or microphone array so that the system can pick up better voices from all participants and give each individual better acoustic experience through generation of more accurate directional sound effects.

SUMMARY OF THE INVENTION

The embodiments described herein are directed to systems and methods that substantially obviate one or more of the above and other problems associated with the conventional acoustic systems and methods.

In accordance with one aspect of the embodiments described herein, there is provided a system comprising a projector configured to project a temporal projector light signal, wherein the temporal projector light signal is encoded, for each pixel of the projector, with an information segment comprising the pixel coordinates of the each pixel of the projector; and at least one light sensor operatively coupled to a computer, wherein the light sensor is configured to detect the temporal projector light signal and generate a sensor signal and wherein the computer is configured to receive a sensor signal from the light sensor, to calculate a direction information based on the detected temporal projector light signal and to steer a plurality of microphones or a plurality of speakers based on the calculated direction information.

In one or more embodiments, the computer is further configured to periodically re-calculate the direction information based on the detected temporal projector light signal.

In one or more embodiments, the calculated direction information comprises direction of a user with respect to the plurality of microphones.

In one or more embodiments, the calculated direction information comprises direction of a user with respect to the plurality of speakers.

In one or more embodiments, the calculated direction information comprises direction of a head of a user with respect to a plurality of video monitors displaying a plurality of video streams, wherein when the head of the user is determined to be pointed towards a first video monitor of the plurality of video monitors, the computer is configured to use the plurality of speakers to steer towards the user an audio stream corresponding the video stream of the plurality of video streams displayed on the first video monitor.

In one or more embodiments, the calculated direction information comprises a direction towards each user in a room, wherein the computer is configured to use the plurality of speakers to steer towards each user an audio stream having specific parameters for each user In one or more embodiments, the specific parameters comprise a sound level.

In one or more embodiments, the at least one light sensor is disposed on each user.

In one or more embodiments, the calculated direction information comprises a direction towards a user in a room, wherein the computer is configured to steer a plurality of microphones towards the user.

In one or more embodiments, the plurality of microphones or the plurality of speakers are steered using a phase shift.

In accordance with another aspect of the embodiments described herein, there is provided a method comprising: using a projector to project a temporal projector light signal, wherein the temporal projector light signal is encoded, for each pixel of the projector, with an information segment comprising the pixel coordinates of the each pixel of the projector; detecting the temporal projector light signal using a light sensor operatively coupled to a computer and generating corresponding sensor signal; and using the computer to receive the sensor signal, to calculate a direction information based on the detected temporal projector light signal and to steer a plurality of microphones or a plurality of speakers based on the calculated direction information.

In one or more embodiments, the computer is further configured to periodically re-calculate the direction information based on the detected temporal projector light signal.

In one or more embodiments, the calculated direction information comprises direction of a user with respect to the plurality of microphones.

In one or more embodiments, the calculated direction information comprises direction of a user with respect to the plurality of speakers.

In one or more embodiments, the calculated direction information comprises direction of a head of a user with respect to a plurality of video monitors displaying a plurality of video streams, wherein when the head of the user is determined to be pointed towards a first video monitor of the plurality of video monitors, the computer is configured to use the plurality of speakers to steer towards the user an audio stream corresponding the video stream of the plurality of video streams displayed on the first video monitor.

In one or more embodiments, the calculated direction information comprises a direction towards each user in a room, wherein the computer is configured to use the plurality of speakers to steer towards each user an audio stream having specific parameters for each user In one or more embodiments, the specific parameters comprise a sound level.

In one or more embodiments, the at least one light sensor is disposed on each user.

In one or more embodiments, the calculated direction information comprises a direction towards a user in a room, wherein the computer is configured to steer a plurality of microphones towards the user.

In one or more embodiments, the plurality of microphones or the plurality of speakers are steered using a phase shift.

In accordance with yet another aspect of the embodiments described herein, there is provided a tangible computer-readable medium embodying a set of instructions implementing a method comprising: using a projector to project a temporal projector light signal, wherein the temporal projector light signal is encoded, for each pixel of the projector, with an information segment comprising the pixel coordinates of the each pixel of the projector; detecting the temporal projector light signal using a light sensor operatively coupled to a computer and generating corresponding sensor signal; and using the computer to receive the sensor signal, to calculate a direction information based on the detected temporal projector light signal and to steer a plurality of microphones or a plurality of speakers based on the calculated direction information.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
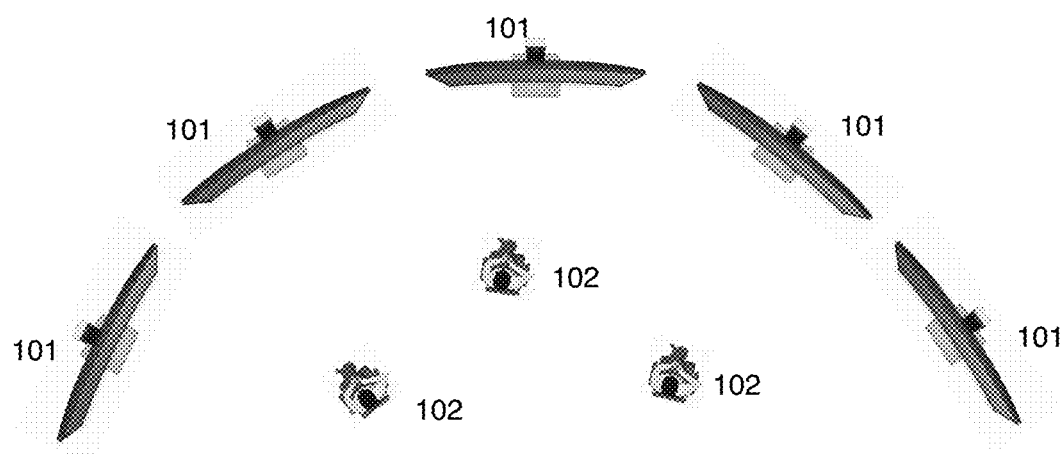
FIG. 1 illustrates an exemplary embodiment of a control center with multiple video feeds displayed on multiple video monitors and multiple human participants.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there is provided an inventive technique to steer speaker array or microphone array based on direction outputs of tiny light sensors attached to TV viewers, noisy-environment workers, or AR/VR system users. More specifically, in one embodiment, a projector is installed on a ceiling of a room and is configured to send out different sequential on/off signals for each pixel. There are also two light sensors attached to each speaker array or microphone array, and one or more light sensors attached to each user. Because each projector pixel corresponds to a specific direction, when a light sensor receives sequential signal from the projector, the light sensor can determine its direction corresponding to the projector and report this direction information to a central station. With the speaker/microphone array direction and user direction known, the system can give proper phase shifts to different speaker signals and generate directional sound for each individual. Similarly, the central station can determine phase shifts for combining audio outputs from different microphones. Different from microphone array based sound source localization, the described method does not have blind source separation issues, and is more reliable and accurate. These properties are good for capturing high quality audio signals based on microphone arrays. Similarly, it is also good for generating high quality directional speaker signal for TV viewers, or AR/VR headset users and other similar applications. With this setup, AR/VR headsets need much less bandwidth than sending and receiving high quality audio signals. This is important when many headsets are present in the environment. Moreover, the described technique can increase the speaker/microphone array steering speed. It can also reduce AR/VR headset weight and power consumption by eliminating microphones, speakers, and related circuits (power used by light sensor is much smaller than close-talk microphones and earbuds). Additionally, by removing microphones and earplugs from headset, users may feel more natural than wearing close-talking microphone or earplugs.

FIG. 1 illustrates an exemplary embodiment of a control center with multiple video feeds displayed on multiple video monitors 101 and multiple human participants 102. In this type of environment, the desired operation of the audiovisual system is the following: when one or more local human attendees 102 turn towards a particular video feed shown on a monitor 101, they should be able to clearly hear the corresponding audio of the video feed and should be heard clearly by the party in the video feed. This desired mode of operation still cannot be achieved with the existing technology.

In this situation, uniformly amplifying all video feeds may make the control center very noisy and damage experiences of all participants. If face detection is used to steer multiple speaker arrays, as described, for example, in H. Mizoguchi; Y. Tamai; K. Shinoda; S. Kagami; K.

Nagashima, Invisible messenger: visually steerable sound beam forming system based on face tracking and speaker array, IEEE IROS2004, Sendai, Japan, cross-talks among video feeds may be decreased to a certain extent. However, local human participants may still experience noisy conditions because they would hear all video feeds no matter which direction they are facing. Needless to say, this is not a natural feeling for local participants. On the other hand, if a state-of-the-art microphone array system described in T. F. Bergh, Speaker Tracking Based on Face Detection and Voice Activity Detection Using a Microphone Array, IEEE IPIN (Indoor Positioning and Indoor Navigation) 2014, Busan, Korea, is used to locate participants' locations, these local participants have to substantially raise their voices for a good sound source location detection. Because local participants have to compete with loud speakers of all video feeds, getting 'attention' of the microphone array is an extremely difficult task.

As would be appreciated by persons of ordinary skill in the art, human voice may be picked with close-talking microphones. Clear sound to individuals can be send through personal earplugs. However, having too many high-quality Bluetooth microphones and headsets are expensive and may degrade audio quality because of network traffic. Long time use of ear plugs may also hurt local participants' hearing ability. Alternatives to personal microphones or earplugs in public space are software steerable speaker arrays and microphone arrays. With software steerable speaker arrays and microphone arrays and a proper attendee detection approach, a system can isolate and amplify sound using beamforming technology so that its performance can get closer to the desired mode of operation that was described in the previous paragraph.

Traditional microphone array approach uses microphone array to detect sound sources, do blind sound source separation, and steer microphone array to certain sound sources for better voice captures. With this approach, when the number of sound source is greater than the number of microphones, there is no easy way to determine all sound sources. In a high-noise environment, determining the sound source direction is also tricky and unreliable. These unreliable sound source estimations may degrade the beamforming results. Additionally, microphone-array based sound source localization and beamforming algorithm has to use past audio signal to estimate current beamforming direction. That approach is not suitable for steering microphone array to follow a moving sound source. Moreover, for speaker array applications, there is no user sound generated for detecting accurate locations of users.

To overcome the above and other issues, an embodiment of the described system deploys an infrared (IR) light projector mounted on the ceiling of a room, together with multiple mini light sensors attached to each speaker array, microphone array, and user. With this setup, the entire space is partitioned based on solid angles corresponding to different projector pixels. Each projector pixel is modulated with a unique digital sequential code.

Figure 2A:
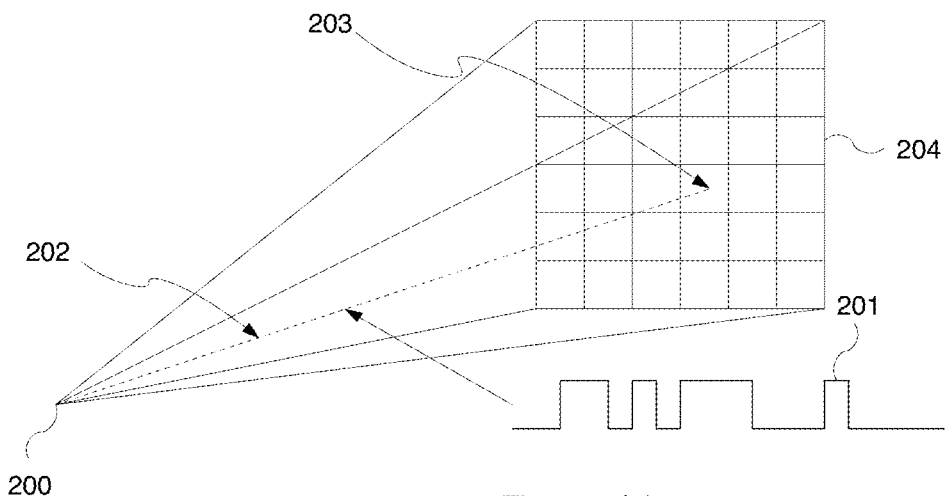
FIGS. 2(a) and 2(b) illustrate two exemplary temporal coded light signals produced by a projector.
Figure 2B:
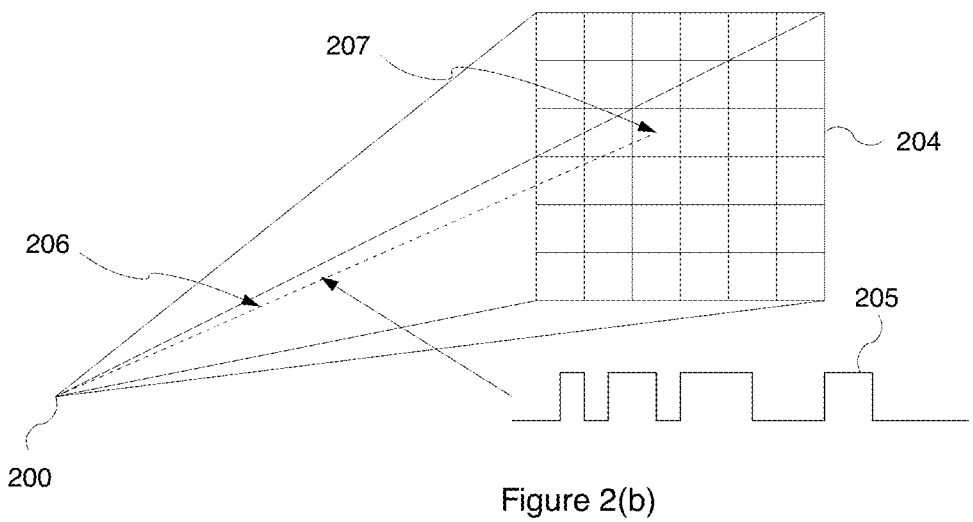

FIGS. 2(a) and 2(b) illustrate two exemplary temporal coded light signals 201 and 205 produced by a projector 200. In one embodiment, the projector 200 is a DLP projector, well known to persons of ordinary skill in the art. The temporal light signals 201 and 205 correspond to two different pixels 203 and 207 of the projector 200. The temporal light signal 201 propagating in the direction 202 is encoded with unique position information of the first projector pixel 203 using a corresponding first unique sequence of temporal light pulses. On the other hand, the temporal light signal 205 propagating in the direction 206 is encoded with unique position information of the second projector pixel 207 using a corresponding second unique sequence of temporal light pulses. In FIGS. 2(a) and 2(b) the projector pixels 203 and 207 are illustrated by their corresponding projections and on an imaginary projection surface 204. The aforesaid first and second sequences of light pulses are different and carry information about the respective projector pixel.

As would be appreciated by persons of ordinary skill in the art, because the correspondences between code embedded in light and solid angles are predefined, the system can use a light sensor received code to easily determine its direction toward the light source. In this way, it can determine the users' locations as well as the direction of a speaker array or microphone array. The user/speaker-array/microphone-array relation can then be used for steering speaker arrays and microphone arrays. Since light sensor can be as small as 0.1 mm×0.1 mm with current technology, a small light sensor is more portable than close-talking microphones and earplugs. Additionally, because user location changing frequency is much lower than audio frequency, Bluetooth/WIFI bandwidth consumption of location data transmission is much lower than transmitting high quality audio signals. That can save more power and bandwidth of wearable sensors.

In another example, a person wants to watch TV at home without disturbing other family members. With the described setup, the light sensor disposed on the user can decode the direction signal it receives and let the system use that information to steer the speaker array for high quality sound without affecting other family members or user's own hearing ability. For family members with different hearing ability, it is also possible to provide people who wear different light sensors with different audio volume. Because the speaker array can be steered based on the direction of light sensor, the TV user or family members can move freely in front of TV and still receive the personalized sound volume. Because the light sensor can be tracked at 70 Hz or even higher frequency, users' movements will not affect the personalized audio beamforming.

Figure 3:
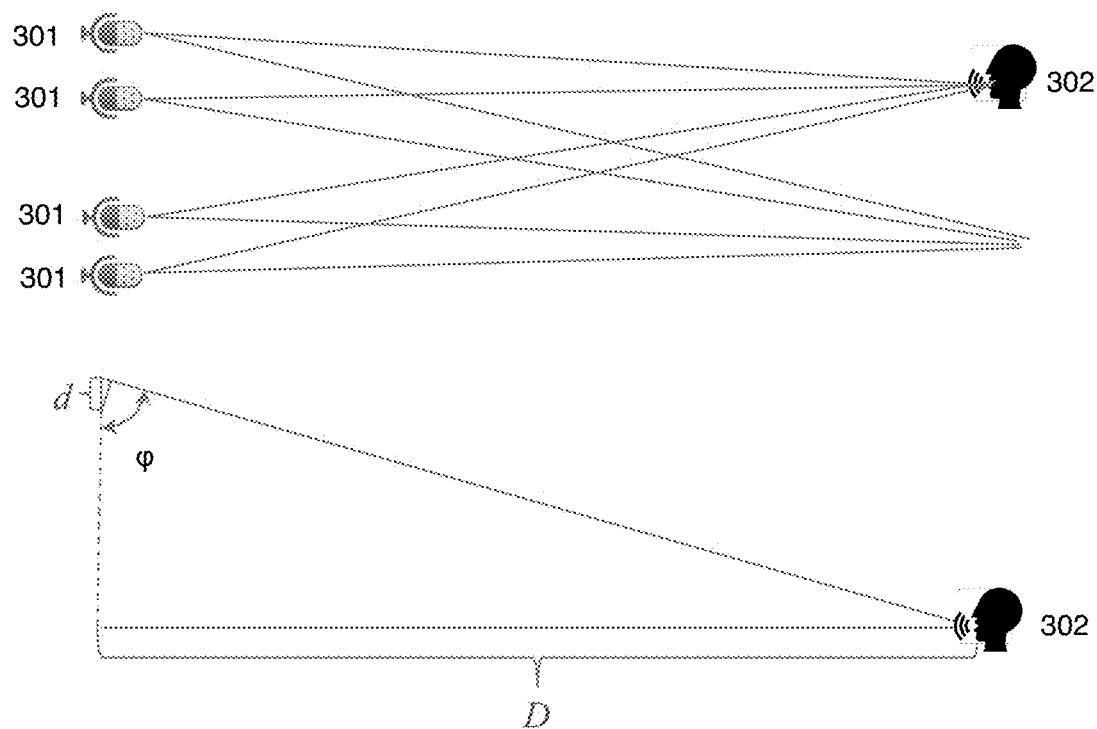
FIG. 3 illustrates an exemplary embodiment of a speaker/microphone array system.
Figure 4:
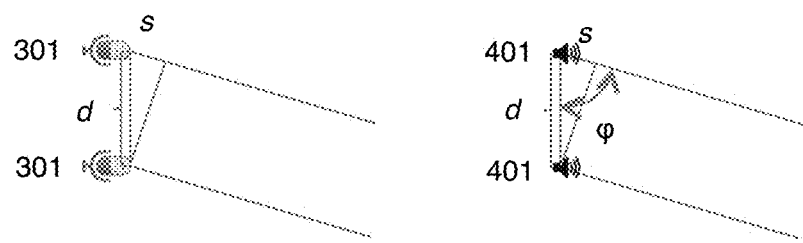
FIG. 4 illustrates that when the distance between speakers or microphones is much smaller than the distance between the corresponding speaker and microphone arrays, the sound may be considered to come in and go out in the same direction without a big approximation error.

FIG. 3 illustrates an exemplary embodiment of a speaker/microphone array system. When the distance between speaking users 302 or microphones 301 is much smaller than the distance D between the corresponding speaking users and microphone arrays, the sound may be considered to come in and go out in the same direction without a big approximation error, see FIG. 4. Denoting the distance between two microphones 301 or two speakers 401 as d, the sound travel distance difference s between two microphones 301 or two speakers 401 will be determined by the following formula:

$$s = d^* \sin(\varphi)$$

This distance s can be used to calculate the corresponding phase shift as well known to persons of ordinary skill in the art. In one or more embodiments, this parameter can be used for microphone array or speaker array beamforming in the manner described above.

Exemplary Embodiment of a Computer System

Figure 5:
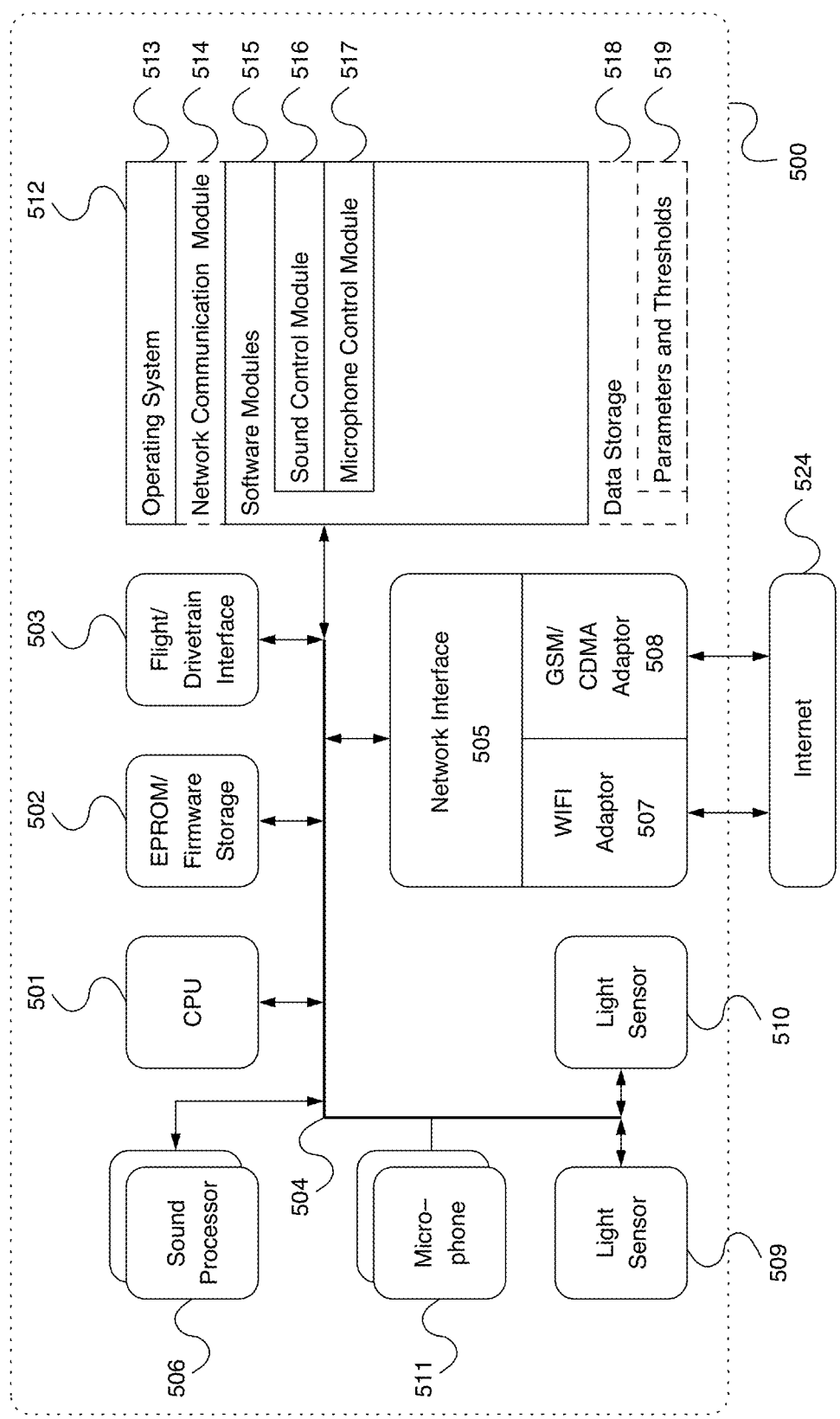
FIG. 5 illustrates an exemplary embodiment of a computer system, which may be used to implement the inventive techniques described herein.

FIG. 5 illustrates an exemplary embodiment of a computer system 500, which may be used to implement the techniques described herein. In one or more embodiments, the computer 500 may be implemented within the form factor of a mobile computing device well known to persons of skill in the art. In an alternative embodiment, the computer 500 may be implemented based on a laptop or a notebook computer. Yet in an alternative embodiment, the computer 500 may be a specialized computing system.

The computer 500 may include a data bus 504 or other interconnect or communication mechanism for communicating information across and among various hardware components of the computer 500, and a central processing unit (CPU or simply processor) 501 coupled with the data bus 504 for processing information and performing other computational and control tasks. The computer 500 also includes a memory 512, such as a random access memory (RAM) or other dynamic storage device, coupled to the data bus 504 for storing various information as well as instructions to be executed by the processor 501. The memory 512 may also include persistent storage devices, such as a magnetic disk, optical disk, solid-state flash memory device or other non-volatile solid-state storage devices.

In one or more embodiments, the memory 512 may also be used for storing temporary variables or other intermediate information during execution of instructions by the processor 501. Optionally, computer 500 may further include a read only memory (ROM or EPROM) 502 or other static storage device coupled to the data bus 504 for storing static information and instructions for the processor 501, such as firmware necessary for the operation of the computer 500, basic input-output system (BIOS), as well as various configuration parameters of the computer 500.

In one or more embodiments, the computer 500 may additionally incorporate two or more luminosity sensors 509 and 510 for detecting the coded light signal generated by the projector 200. In one embodiment, the luminosity sensors 509 and 510 have a fast response time to provide for high frequency position detection. In addition, the computer 500 may incorporate multiple sound processors 506 for generating audio signal as well as multiple microphones 511 for picking up the audio.

In one or more embodiments, the computer 500 may additionally include a communication interface, such as a network interface 505 coupled to the data bus 504. The network interface 505 may be configured to establish a connection between the computer 500 and the Internet 524 using at least one of WIFI interface 507 and the cellular network (GSM or CDMA) adaptor 508. The network interface 505 may be configured to provide a two-way data communication between the computer 500 and the Internet 524. The WIFI interface 507 may operate in compliance with 802.11a, 802.11b, 802.11g and/or 802.11n protocols as well as Bluetooth protocol well known to persons of ordinary skill in the art. In an exemplary implementation, the WIFI interface 507 and the cellular network (GSM or CDMA) adaptor 508 send and receive electrical or electromagnetic signals that carry digital data streams representing various types of information.

In one or more embodiments, the Internet 524 typically provides data communication through one or more subnetworks to other network resources. Thus, the computer 500 is capable of accessing a variety of network resources located anywhere on the Internet 524, such as remote media servers, web servers, other content servers as well as other network data storage resources. In one or more embodiments, the computer 500 is configured send and receive messages, media and other data, including application program code, through a variety of network(s) including Internet 524 by means of the network interface 505. In the Internet example, when the computer 500 acts as a network client, it may request code or data for an application program executing in the computer 500. Similarly, it may send various data or computer code to other network resources.

In one or more embodiments, the functionality described herein is implemented by the computer 500 in response to processor 501 executing one or more sequences of one or more instructions contained in the memory 512. Such instructions may be read into the memory 512 from another computer-readable medium. Execution of the sequences of instructions contained in the memory 512 causes the processor 501 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 501 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 501 for execution. For example, the instructions may initially be carried on a magnetic disk from a remote computer. Alternatively, a remote computer can load the instructions into its dynamic memory and send the instructions over the Internet 524. Specifically, the computer instructions may be downloaded into the memory 512 of the computer 500 from the foresaid remote computer via the Internet 4 using a variety of network data communication protocols well known in the art.

In one or more embodiments, the memory 512 of the computer 500 may store any of the following software programs, applications and/or modules:

1. Operating system (OS) 513, which may be a mobile operating system for implementing basic system services and managing various hardware components of the computer 500. Exemplary embodiments of the operating system 513 are well known to persons of skill in the art, and may include any now known or later developed mobile operating systems. Additionally provided may be a network communication module 514 for enabling network communications using the network interface 505.

2. Software modules 515 may include, for example, a set of software modules executed by the processor 501 of the computer 500, which cause the computer 500 to perform certain predetermined functions, such as generate sound using the sound processors 506 using sound control module 516 and record audio using microphones 511 under control of microphone control module 517.

3. Data storage 518 may be used, for example, for storing various parameters and thresholds 519.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the acoustic systems and methods. It is intended that the specification and examples be considered as exemplary only, with a true scope and spirit of the invention being indicated by the following claims.

What is claimed is:

1. A system comprising:
   a. a projector configured to project a temporal projector light signal, wherein the temporal projector light signal is encoded, for each pixel of the projector, with an information segment comprising the pixel coordinates of the each pixel of the projector; and
   b. at least one light sensor operatively coupled to a computer, wherein the light sensor is configured to detect the temporal projector light signal and generate a sensor signal and wherein the computer is configured to receive a sensor signal from the light sensor, to calculate a direction information based on the detected temporal projector light signal and to steer a plurality of microphones or a plurality of speakers based on the calculated direction information.

2. The system of claim 1, wherein the computer is further configured to periodically re-calculate the direction information based on the detected temporal projector light signal.

3. The system of claim 1, wherein the calculated direction information comprises direction of a user with respect to the plurality of microphones.

4. The system of claim 1, wherein the calculated direction information comprises direction of a user with respect to the plurality of speakers.

5. The system of claim 1, wherein the calculated direction information comprises direction of a head of a user with respect to a plurality of video monitors displaying a plurality of video streams, wherein when the head of the user is determined to be pointed towards a first video monitor of the plurality of video monitors, the computer is configured to use the plurality of speakers to steer towards the user an audio stream corresponding the video stream of the plurality of video streams displayed on the first video monitor.

6. The system of claim 1, wherein the calculated direction information comprises a direction towards each user in a room, wherein the computer is configured to use the plurality of speakers to steer towards each user an audio stream having specific parameters for each user.

7. The system of claim 6, wherein the specific parameters comprise a sound level.

8. The system of claim 6, wherein the at least one light sensor is disposed on each user.

9. The system of claim 1, wherein the calculated direction information comprises a direction towards a user in a room, wherein the computer is configured to steer a plurality of microphones towards the user.

10. The system of claim 1, wherein the plurality of microphones or the plurality of speakers are steered using a phase shift.

11. A method comprising:
    a. using a projector to project a temporal projector light signal, wherein the temporal projector light signal is encoded, for each pixel of the projector, with an information segment comprising the pixel coordinates of the each pixel of the projector;
    b. detecting the temporal projector light signal using a light sensor operatively coupled to a computer and generating corresponding sensor signal; and
    c. using the computer to receive the sensor signal, to calculate a direction information based on the detected temporal projector light signal and to steer a plurality of microphones or a plurality of speakers based on the calculated direction information.

12. The method of claim 11, wherein the computer is further configured to periodically re-calculate the direction information based on the detected temporal projector light signal.

13. The method of claim 11, wherein the calculated direction information comprises direction of a user with respect to the plurality of microphones.

14. The method of claim 11, wherein the calculated direction information comprises direction of a user with respect to the plurality of speakers.

15. The method of claim 11, wherein the calculated direction information comprises direction of a head of a user with respect to a plurality of video monitors displaying a plurality of video streams, wherein when the head of the user is determined to be pointed towards a first video monitor of the plurality of video monitors, the computer is configured to use the plurality of speakers to steer towards the user an audio stream corresponding the video stream of the plurality of video streams displayed on the first video monitor.

16. The method of claim 11, wherein the calculated direction information comprises a direction towards each user in a room, wherein the computer is configured to use the plurality of speakers to steer towards each user an audio stream having specific parameters for each user.

17. The method of claim 16, wherein the specific parameters comprise a sound level.

18. The method of claim 16, wherein the at least one light sensor is disposed on each user.

19. The method of claim 11, wherein the calculated direction information comprises a direction towards a user in a room, wherein the computer is configured to steer a plurality of microphones towards the user.

20. The method of claim 11, wherein the plurality of microphones or the plurality of speakers are steered using a phase shift.

21. A non-transitory computer-readable medium embodying a set of instructions implementing a method comprising:
    a. using a projector to project a temporal projector light signal, wherein the temporal projector light signal is encoded, for each pixel of the projector, with an information segment comprising the pixel coordinates of the each pixel of the projector;
    b. detecting the temporal projector light signal using a light sensor operatively coupled to a computer and generating corresponding sensor signal; and
    c. using the computer to receive the sensor signal, to calculate a direction information based on the detected temporal projector light signal and to steer a plurality of microphones or a plurality of speakers based on the calculated direction information.

* * * * *